June 25, 1968 L. G. KAPLAN Re. 26,417

SHOCK ABSORBING LINKAGE MECHANISM

Original Filed Dec. 23, 1957 2 Sheets-Sheet 1

INVENTOR
LOUIS G. KAPLAN
by Herman G. Welsch
ATTY.

June 25, 1968 L. G. KAPLAN Re. 26,417

SHOCK ABSORBING LINKAGE MECHANISM

Original Filed Dec. 23, 1957 2 Sheets-Sheet 2

INVENTOR
LOUIS G. KAPLAN
by: Norman Gerlach
ATTY.

United States Patent Office

Re. 26,417
Reissued June 25, 1968

26,417

SHOCK ABSORBING LINKAGE MECHANISM

Louis G. Kaplan, Evanston, Ill., assignor to Cullen-Friestedt Company, Chicago, Ill., a corporation of Illinois Original No. 2,959,411, dated Nov. 8, 1960, Ser. No. 704,385, Dec. 23, 1957. Application for reissue Aug. 7, 1967, Ser. No. 663,461
1 Claim. (Cl. 267—71)

Matter enclosed in heavy brackets [ ] appears in the original patent but forms no part of this reissue specification; matter printed in italics indicates the additions made by reissue.

*ABSTRACT OF THE DISCLOSURE*

*A shock absorbing, spring-biased, linkage assembly adapted for interpositioning between the opposed jaws of a lifter, the assembly being of an extensible and contractible nature and being spring-biased in both directions so that it will assimilate shock resulting from either an outside or an inside impact on either lifted jaw.*

The present invention relates to lifters for use in handling and moving or transporting metallic sheets and like articles from place to place. The invention is particularly concerned with lifters of the type which [are] *is* adapted to be hoisted and moved from one place to another by a crane or overhead hoist. A lifter of this character has as its principal components or parts: (1) a supporting element having means thereon whereby it may be attached to a hook or other connecting device on the operating end of [a] *the* crane or [a] hoist with which the lifter is to be used; (2) a pair of opposed horizontally elongated, complemental jaws which are pivotally connected to the supporting [elements] *element* so that they are capable of swinging toward and away from each other into and out of engagement with the side margins of the sheets or other articles to be lifted; (3) a reversible electric motor which is mounted on the supporting element; and (4) a train of motor actuated gearing which is associated with, and carried by, the supporting element, operates when driven in one direction to shift the jaws apart and when driven in the opposite direction to move the jaws toward each other into gripping relation with the sheets or other articles and includes a speed reducing unit operatively connected between the drive shaft of the motor and a horizontal rock shaft positioned under the supporting element and operatively connected through linkage mechanism to the jaws. A lifter of this character [has been] *is* shown and described in [the] United States Patent to Hooker No. 2,695,809, dated Nov. 30, 1954 and entitled "Lifter," and the present invention is designed as an improvement over such a lifter construction.

In the above-mentioned patent to Hooker there [has been] *is* disclosed a lost motion linkage mechanism which extends between the jaw-actuating rock-shaft and one of the two cooperating jaws, the lost motion mechanism being provided with a take-up spring which is adapted to become compressed when the two jaws are brought into engagement with the side margins of the sheets or other articles which are to be lifted or when either jaw is subjected to shock or impact tending to limit its inward swinging motion. The take-up spring associated with the lost motion linkage mechanism shown and described in the above-mentioned Hooker patent serves normally to take up lost motion in one direction only and thus the lost motion connection is effective to assimilate shock only when there is an impact tending to limit the inward swinging motion of the jaws. In the event of an impact tending to limit the outward swinging motion of the jaws, the lost motion connection is rigid and thus no protection against shock is offered to either the speed reducing unit or the electric motor which drives the same. Such shock may be the result of the jaws becoming wedged between two adjacent objects during their outward swinging motion, or it may be the result of inadvertent contact between the outer surface of one of the jaws and an adjacent object, either during outward swinging movement of the jaw or during transportation of the unloaded lifter assembly by the hoist mechanism from one location to another.

It is among the principal objects of the present invention to provide a lifter of the type briefly outlined above and shown in the above-mentioned patent to Hooker *and* in which the actuating rock-shaft for the lifter jaws is operatively connected to one of the jaws by one or more double-acting spring-biased lost motion linkage mechanisms capable of absorbing any sudden shock which may be applied to the lifter jaws from the outside or from the inside of the jaw structure during outward or inward swinging movements of the jaws respectively, and also capable of absorbing shock which may be entered by the jaws during transportation of the lifter when the jaws are empty, whether the shock be occasioned by an inside or an outside blow on the lifter jaws.

Other objects and advantages of the invention, not at this time enumerated, will become more readily apparent as the nature of the invention is better understood.

In the accompanying two sheets of drawings forming a part of this specification a preferred embodiment of the invention [has been] *is* shown.

Figure 1:
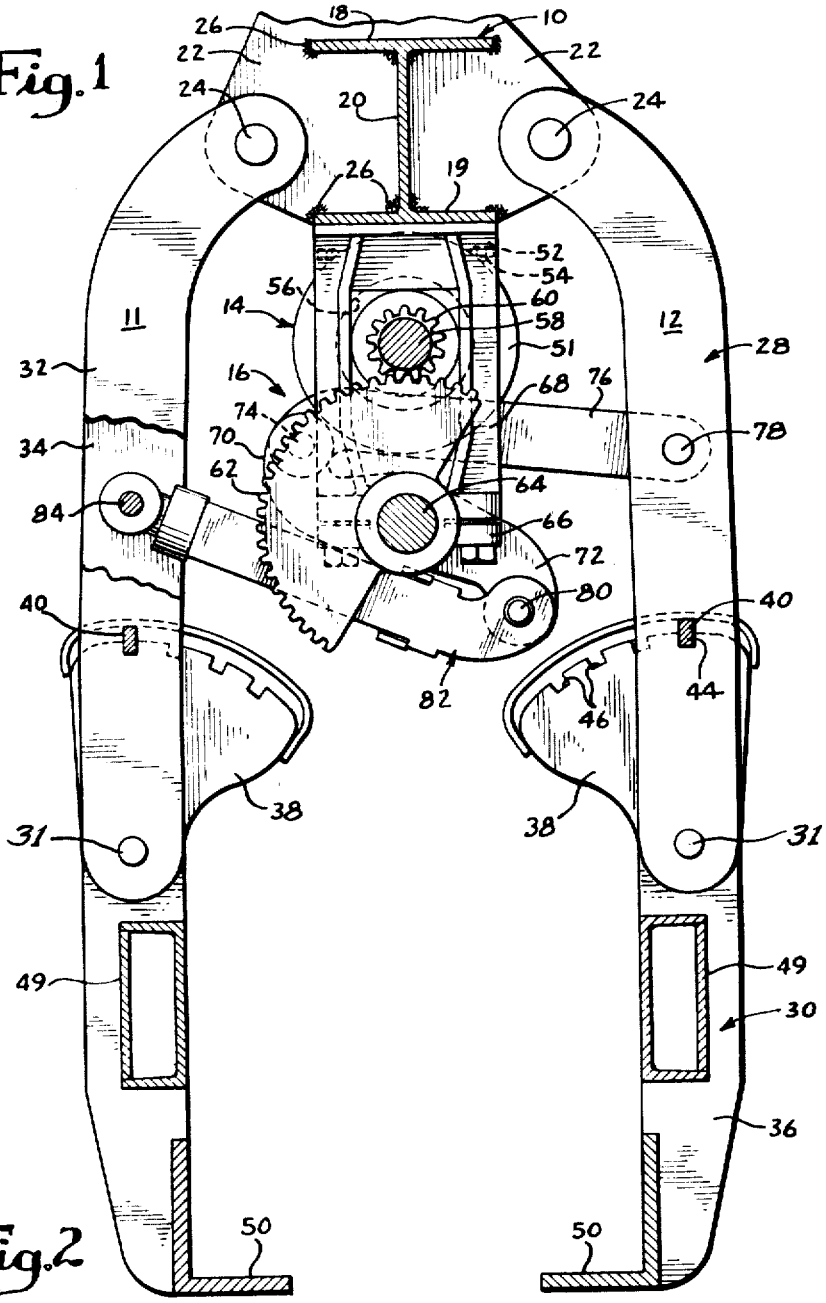
FIG. 1 is a fragmentary vertical sectional view taken through a lifter assembly in the vicinity of the power actuated gear driving mechanism therefor and showing *the* improved linkage mechanism of the present invention operatively applied thereto.
Figure 2:
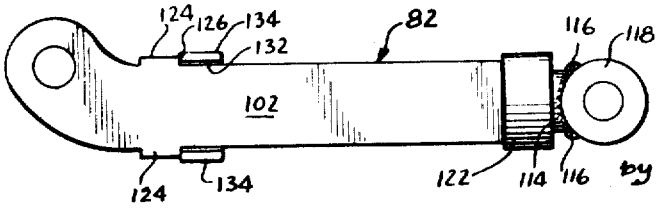
FIG. 2 is a side elevational view of a link assembly employed in connection with the present invention.

Referring now to the drawings in detail and in particular to FIG. 1, the improved linkage mechanism of the present invention is shown as being operatively applied to a lifter of the general type shown and described in the above-mentioned patent to Hooker, No. 2,695,809. Only such portions of the lifter assembly as are pertinent to the operation of the linkage mechanism [have been] *are* illustrated herein and for a detailed description of the entire mechanism and its mode of operation, reference may be had to [this] *said* patent. The lifter involves in its general organization an elongated supporting element 10, a pair of jaw assemblies 11 and 12, a reversible electric motor 14, and a power train 16 extending between the motor and jaws for conjointly shifting the latter toward and away from each other in response to operation of the motor.

The supporting element 10 is in the form of a horizontally extending I-beam having horizontal top and bottom flanges 18 and 19, respectively, connected together by a vertically extending web 20. At suitable spaced points along the I-beam 10 there [are] *is* provided a series of spaced attachment or pivot lugs, only one of which [has been] *is* disclosed herein and designated at 22. Each lug 22 has pivotally connected thereto on opposite sides thereof one of the [pairs] *pair* of jaw assemblies 11 and 12, each jaw assembly being attached to the lug by means of a pivot pin 24. The pivot lugs 22 fit between the top and bottom flanges 18 and 19 of the supporting element 10 and are welded as at 26 in position thereon. The two jaw assemblies 11 and 12 are substantially identical in construction and each is in the form of a composite assembly including an upper or proximate jaw section 28 and a lower or distal jaw section 30 hingedly connected as at 31 to the upper section.

Figure 3:
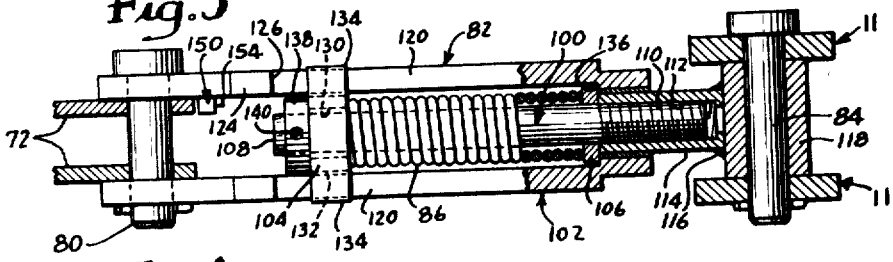
FIG. 3 is a sectional view taken substantially along the line 3—3 of FIG. 1.
Figure 4:
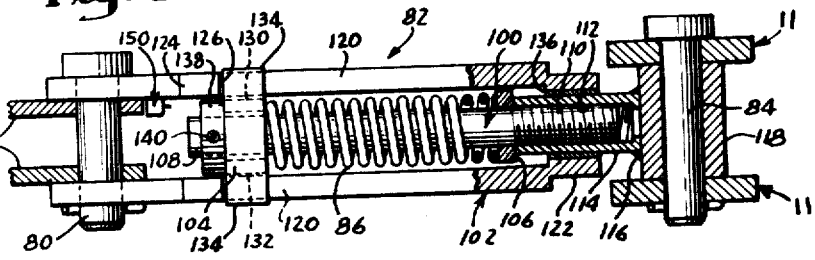
FIG. 4 is a sectional view similar to FIG. 3 *but* showing the link assembly in an extended position.
Figure 5:
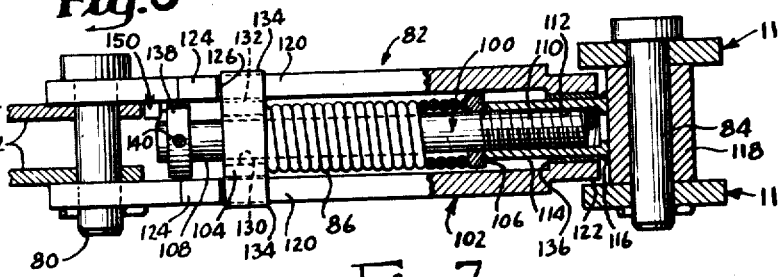
FIG. 5 is a sectional view similar to FIGS. 3 and 4 *but* showing the link assembly in a contracted position.

The upper jaw section 28 has its upper end region curved inwardly and the section is comprised of a pair of laterally spaced flat metal bars 32 and 34 (see also FIGS. 3, 4 and 5). The upper ends of the bars 32 and 34 straddle the pivot lug 22 and the pivot pin 24 extends through the three thicknesses of metal involved. The lower section 30 is in the form of a single flat metal bar 36, the upper region of which projects between the bars 32 and 34, with the hinge pin 31 extending through the three metal thicknesses. The extreme upper end region of the bar 36 is in the form of a toothed sector 38 capable of swinging movement between the bars 32 and 34 of the upper jaw section 28 and capable of being locked in any desired angular position of adjustment by means of a lock bar 40 which passes through a pair of slots 44 provided in the bars 32 and 34 and which is capable of being selectively received in a series of notches 46 formed on the periphery of the sector 38. The lock bar and sector arrangement just described provides a convenient means whereby the angular position of the lower jaw section 30 may be adjusted relative to the upper jaw section 28 to decrease or increase the effective span of the two jaws to adapt the jaws to articles of varying width. The lower jaw section 30 of each jaw assembly 11 or 12, as the case may be, are cross-connected by means of horizontally extending box-section type members 49, the ends of which are welded or otherwise secured fixedly to the central regions of the flat bars 36. The lower ends of the lower jaw sections 30 carry opposed angle bar gripping members 50. The electric motor 14 by means of which the jaws 11 and 12 are actuated is preferably of the reversible series wound direct current type. The motor includes a casing 51 having a mounting flange 52 secured by bolts 54 to the underneath side of the horizontal lower flange 19 of the supporting element 10. The motor has operatively associated therewith a gear reduction mechanism 56 having an output shaft 58 carrying a pinion 60 constituting one element of the previously mentioned power train 16.

The power train 16 which extends between the output shaft 58 of the gear reduction device 56 and the jaws 11 and 12 is comprised of a set of gearing including the pinion 60 and a linkage mechanism, the latter constituting one of the important features of the present invention. The gearing, in addition to the pinion 60, comprises a gear segment 62 which meshes with the pinion 60. The gear segment 62 is keyed or otherwise secured to a rock-shaft 64 suitably mounted in bearings 66 provided on a bracket 68 which depends from the underneath side of the flange 19 [associated with] *of* the supporting element 10. Also keyed or otherwise secured to the rock-shaft 64 [are] *is* a pair of bifurcated crank arms 70 and 72 which extend radially outwardly from the rock-shaft 64 generally in opposite directions. The distal end of the crank arm 70 is pivotally connected as at 74 to one end of a thrust link 76, the other end of the link 76 being pivotally connected as at 78 to a medial region of the upper jaw section 28 of the jaw *assembly* 12. The distal end of the crank arm 72 is pivotally connected by a horizontal pivot pin 80 to one end of a spring biased lost-motion link assembly designated in its entirety at 82, the other end of the link assembly 82 being pivotally connected by a horizontal pivot pin 84 to a medial region of the upper jaw section 28 of the jaw *assembly* 11.

The arrangement of parts thus far described, with the exception of the specific character of the link assembly 82, is purely conventional and no claim is made herein to any novelty associated with the same. For a more detailed description of the motor 14, gear reduction device 56, the specific mounting means for the motor and its gear reduction device and other mechanism which may be associated with the lifter assembly and which is not pertinent to the present invention, reference may be had to the above-mentioned Hooker patent for a full disclosure of these details. The invention of the present application resides rather in the novel construction and arrangement of parts associated with the spring biased lost motion link assembly 82 which will now be described in detail and its operation subsequently set forth.

The link assembly 82 involves in its general organization four relatively movable parts or assemblies, together with a preload compression spring which serves to maintain these assemblies in a normal or intermediate position when the link assembly 82 as a whole is in its free state, or when compressional or tensional forces below a predetermined minimum are applied to the ends of the assembly. The compression spring by means of which these four parts or assemblies are normally held in their neutral or inoperative position is designated in its entirety at 86.

The four parts or assemblies set forth above include an inner link member 100, an outer encompassing link member 102, a slide member 104, and thrust collar 106. The inner link member is of a composite nature and comprises a cylindrical rod 108, one end of which is threaded as at 110 and is threadedly received in a threaded bore 112 of a socket member 114. One end of the socket member 114 is welded as at 116 to a sleeve 18 which, in combination with the pivot pin 84, provides the pivotal connection whereby one end of the link assembly is connected to the members 32 and 34 of the upper jaw section 28 of the jaw *assembly* 11. The outer link member 102 may be in the form of a casting providing a pair of parallel flat bar-like arms 120, the right hand ends of which, as viewed in FIGS. 2, 3, 4 and 5, are connected together by a sleeve portion 122 which surrounds and is slidable on the socket portion 114 of the inner link member 100. The left hand ends of the bar-like arms 120 are connected by means of the pivot pin 80 to the bifurcated crank arm 72. The upper and lower edges of the arms 120 are each formed with lugs 124 providing shoulders or abutments 126, the function of which will be set forth presently.

Figure 6:
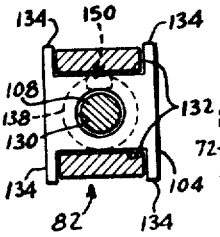
FIG. 6 is a sectional view taken substantially along the line 6—6 of FIG. 3.

The slide member 104 is in the form of a relatively thick plate or block (FIGS. 3 and 6) having a central opening 130 therethrough, through which the rod 108 extends and in which opening it is slidable. The opposite edges of the [plate] *block* 104 are notched as at 132 to provide pairs of ears 134 which straddle the members or arms 120, respectively, so that the block 104 is constrained to slide longitudinally on these arms. The collar 106 surrounds the rod 108 in the immediate vicinity of the socket *member* 1114 and the rod 108 is slidable through the collar for purposes which will also be made clear presently.

Still referring to FIGS. 2, 3, 4 and 5, the compression spring 86 is of the helical variety and, in its free state, is provided with a series of open or spaced convolutions to allow for limited compression of the spring endwise in the usual manner of operation of such compressing springs. The spring 86 surrounds the [inner] rod 108 and bears at one end against one side of the slide *member or* block 104 and at its other end against the collar 106. The length of the compression spring is such that it normally maintains the collar 106 seated against an internal shoulder 136 provided at the juncture between the sleeve portion 122 and the arms 120, while at the same time maintaining the slide block 104 against the shoulders 126 afforded by the integral lugs 124 on the arms 120. The left hand end of the rod 108 has mounted thereon a limit collar 138 which is anchored in position by a set screw 140 and the distance between the collar 138 and socket member 114 on the rod 108 is such that, in the normal position of the parts as shown in FIG. 3, the compression spring 86, will through the medium of the collar 106, force the slide block 104 and collar 106 outwardly away from each other in opposite directions whereupon the collar 106 will bear against the extreme end of the socket member 114 and cause the entire composite inner member 100 of the assembly 82 to be moved to the right as shown in FIG. 3 until such time as the limit collar 138 bears against the slide member 134. The spring 86 thus maintains the four relatively movable parts *or elements* 100, 102, 104 and 106 of the assembly in the positions in which they are illustrated in FIG. 3, this being the neutral position of the assembly when the same is under neither compressional nor tensional forces.

In the operation of the link assembly 82, when the rock-shaft 64 is turned in a clockwise direction as viewed in FIG. 1, the crank arm 70 will force the link 76 to the right, thus swinging the jaw 12 outwardly about its pivotal axis 24. At the same time the crank arm 72 will force the link assembly 82 to the left thus swinging the jaw 11 outwardly about its pivotal axis 24. Conversely, as is obvious, when the rock-shaft 64 is turned in a counterclockwise direction, the linkage mechanism will be actuated to draw the jaws 11 and 12 inwardly toward each other.

During outward swinging of the jaws 11 and 12 under the motivating influence of the electric motor 14, operating through the gear reduction device 56, output shaft 58 thereof, pinion 60, gear segment 62, crank arms 70 and 72, and links 76 and 82, if the jaws 11 and 12 should become wedged between two opposed adjacent objects, or if one of them should strike an adjacent massive object, counter-torque will be applied to the rock-shaft 64 through the link assembly 82 and such counter-torque, when applied to the shaft 64, will tend to compress the link assembly 82. As shown in FIG. 5, the application of compressional forces to the opposite ends of the link assembly 82 will cause the socket member 114 to slide inwardly through the sleeve portion 122 of the outer link member 102, thus forcing the collar 106 to the left, as viewed in this figure, and compressing the spring 86 between the collar 106 and slide member 104 which is held against the shoulders 126 of the integral lugs 124 on the side bars 120. Movement of the socket portion 114 in this manner will cause the rod 108 to be slid to the left through the slide member 104 so that the limit collar 138 moves away from this slide member. The effective length of the link assembly 82 thus becomes shortened and the spring 86 assimilates the shock which otherwise would be imparted to the power train 116 leading to the motor 14 where conventional rigid link constructions are concerned. When the compressional force on the link assembly 82 is relieved, the parts will be restored to their neutral position as shown in FIG. 3.

When internal shock is encountered by the jaws 11 and 12, as, for example, when the angle bar gripping members 50 engage the side margins of a stack of sheets or other objects to be lifted during inward swinging movement of the jaws 11 and 12 under the influence of the motor 14, such inward swinging motion of the jaws is immediately arrested and tensional forces are applied to the link assembly 82 tending to expand the same longitudinally. When this occurs the inner link part 100 will be moved to the right as viewed in FIG. 4 so that the limit collar 138 will force the slide block 104 to the right along the members 120 on which it is slidable and the spring 86 will be compressed between this slide block and the collar 106. The collar 106 will bear against the internal shoulder 136 and thus receive the end thrust of the spring 86. It will be seen, therefore, that the spring 86 assimilates any shock incident upon interruption of the inward swinging movement of the jaws 11 and 12.

*In the single claim which follows this specification: the "first element" is the link member 102; the "first stop shoulder on said first element" is one of the shoulders 126; the "second element" is the inner link member 100; the "second stop shoulder on said first element" is the internal shoulder 136; the "third element" is the slide member 104; the "first stop shoulder slidable on said first element" is the inner end of the socket member 114; the "second stop shoulder on said second element" is the limit collar 138; and the "fourth element" is the thrust collar 106.*

In order to reduce the flow of current through the electric motor 14 when the movement of the jaws 11 and 12 is interrupted, during outward swinging movement thereof, as previously outlined, a limit switch 150 is mounted on one of the arms 120 of the outer link member 102. The limit switch 150 is provided with an actuating finger 154 which is positioned in the path of movement of the collar 138 which moves to the left relative to the arm 120 as seen in FIG. 3 when the spring 86 is compressed under the influence of compressional forces acting on the opposite ends of the link assembly 82. The limit switch 150 has associated therewith a normally open pair of contacts 158 (FIG. 7), adapted to become closed under the influence of the actuating finger 154. The circuit connections for the limit switch 150 will be set forth subsequently.

The reversible electric motor 14 is of the series wound, direct current type in which reversal of the direction of current flow through the motor armature will effect reversal of the direction of rotation of the motor shaft, and consequently of the output shaft 58 of the gear reduction mechanism 56. Such selective reversal of the current flow through the armature circuit of the motor 14 will control the direction of movement of the lifter jaws 11 and 12. In order to prevent excessive motor speeds during inward swinging movements of the jaws 11 and 12 under the influence of gravitational forces acting upon the jaws, means are provided whereby full line current will be applied to the armature circuit with the current flowing through the circuit in a direction to cause clockwise rotation of the rock-shaft 64 and consequent opening movement of the jaws 11 and 12. The motor 14 will thus be driven under full power. However, when the direction of current flow through the armature circuit is reversed so that the power train 16 is actuated to cause counterclockwise rotation of the rock-shaft 64 to effect closing movement of the jaws 11 and 12, automatically operable means are provided for introducing a resistance element into the armature circuit so that the motor will be driven under reduced power. The circuit diagram of FIG. 7 illustrates schematically the manner in which such a resistance is automatically introduced into the armature circuit of the motor and it also illustrates the manner in which the limit switch 150 is capable of interrupting the flow of current through the armature circuit.

Figure 7:
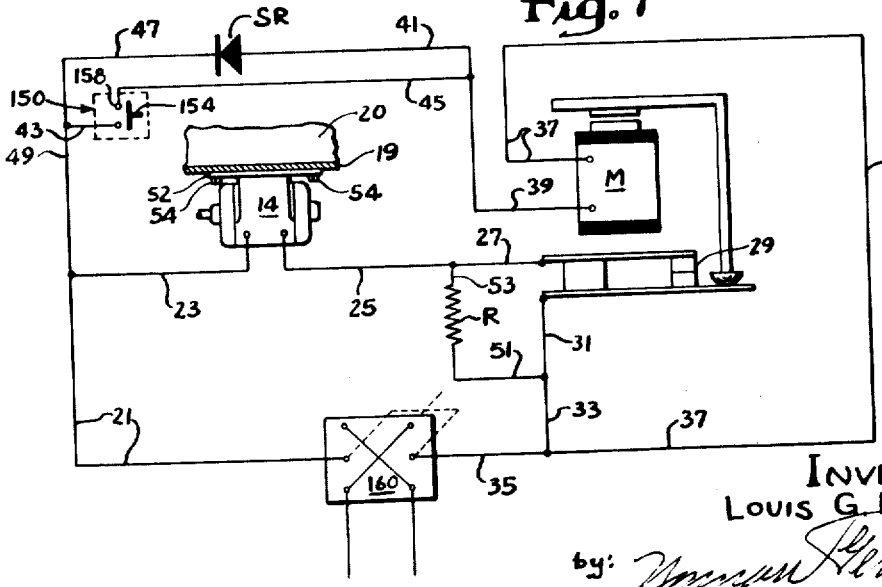
FIG. 7 is a circuit diagram for the electric motor associated with the lifter and illustrating certain safety features employed in connection with the invention.

Referring now to FIG. 7 in detail, full line current may be applied to the armature circuit of the motor 14 from the positive side of the line, through a reversing switch 160, leads 21, 23, motor 14, leads 25, 27, a pair of normally closed contacts 29 associated with a relay magnet M, leads 31, 33, 35, and reversing switch 160 to the negative side of the line. Current flowing through the armature of the motor 14 in this direction will move the rock-shaft 64 in a clockwise direction so as to cause opening movements of the jaws 11 and 12, as previously described.

When the reversing switch 160 is operated to reverse the direction of current flow through the armature of the motor 14, a circuit will exist from the positive side of the line through the reversing switch 160, leads 35, 37, relay magnet M, lead 39, a unidirectional device SR which may be in the form of a selenium rectifier, leads 47, 49, 21, and reversing switch 160 to the negative side of the line. Energization of the relay magnet M will cause opening of the contacts 29, thus establishing a circuit extending from the negative side of the line, through the reversing switch 160, leads 35, 33, 51, resistance R, leads 53, 25, armature of the motor 14, leads 23, 21 and reversing switch 160 to the negative side of the line. The ohmic value of the resistor R may be selected according to engineering requirements to produce a desired voltage drop thereacross and reduce the current flow through the motor armature to such an extent that overspeeding of the motor 14 under the influence of gravitational forces acting upon the jaws 11 and 12 during closing movements thereof will be avoided.

The normally open pair of contacts 158 associated with the previously described limit switch 150 on one of the arms 124 of the outer link member 102 is disposed in shunt relationship with the unidirectional device SR. Thus, when the actuating finger 154 is engaged by the collar 138 and the contacts 158 become closed, the unidirectional device SR will be bypassed and a shunt circuit passing through lead 43, contacts 158, lead 45 and magnet M will be completed, thus opening the contacts 29 and restoring the circuit through the resistor R and motor armature so as to reduce the power output of the motor [10] *14*. Such a condition will obtain, for example, when compressional forces are applied to the ends of the link assembly 82 due to the lifter jaws becoming wedged between two adjacent objects during opening of the jaws under full motor power, as previously described.

A preferred embodiment of the invention [has been] *is* shown in the drawings and described herein, but it should be understood that the invention is not limited to the specific disclosure made. For example, although in FIG. 1 only one of the improved lost motion link assemblies 82 has been shown in association with the gear segment 62, the assembly being connected to the jaw 11, it will be understood that the thrust link 76 may be replaced by an assembly such as the lost motion link assembly 82 having its opposite ends connected between the gear segment 62 and jaw 12. The appended claim should, therefore, be construed as broadly as the prior art will permit.

Having thus described the invention what I claim as new and desire to secure by Letters Patent is:

[1. A compressible and extensible shock absorber link assembly comprising four relatively movable link elements capable of axial shifting movement in opposite directions relative to one another and including a first element having means for attaching the same to one of said arms, a first stop shoulder on said first element facing said other arm, a second element slidable on said first element, having means for attaching the same to the other arm, a second stop shoulder on said first element facing said one arm, a third element slidable on said first element between the two stop shoulders on the latter and being engageable with the first stop shoulder, said second element being slidable through said third element, a first stop shoulder slidable on to said first element, interposed between said third element and the second stop shoulder on the first element and engageable with said latter stop shoulder, a second stop shoulder on said second element on the side of the third element remote from said other arm, facing the latter arm and engageable with said third element, and a compression spring surrounding said second element and bearing at one end against said third element and bearing at its other end against a fourth element, said spring normally urging said fourth element against said stop shoulder on the first element and urging the third element against the second stop shoulder on the second element, said first stop shoulder on said second element being engageable with the fourth element when compressional forces are applied to the link assembly by said attaching means to compress said spring against said third element, said second stop shoulder on the second element being engageable with said third element to compress said spring against said fourth element when tensional forces are applied to the link assembly by said attaching means, said first element being in the form of a pair of spaced parallel bars connected together at the end thereof adjacent said other arm by an integral collar portion, said second element being in the form of a cylindrical rod slidable through said collar portion, said third element being in the form of a block extending across said bars and having notches in the latter side edges thereof within which said bars are slidable, said block also having a hole therethrough through which said rod extends and in which it is slidable, said means for attaching said first element to said one arm including a cylindrical socket member carried by said one arm and having a threaded socket formed therein and in which socket one end of said cylindrical rod is threadedly received.]

*2. A compressible and extensible shock absorber link assembly adapted for operatively connecting two relatively movable arms and comprising a first element having means for attaching the same to one of said arms, said first element being in the form of a pair of spaced parallel bars connected together at the end thereof adjacent to the other arm by an integral collar portion, a second element in the form of a cylindrical rod slidable through said collar portion and having means for attaching to said other arm including a first stop shoulder adapted for carrying by said other arm and having a threaded socket formed therein and in which socket one end of said cylindrical rod is threadedly received, a first stop shoulder on said first element facing the other arm, a second stop shoulder on said first element facing said one arm, a third element in the form of a block extending across said bars and having notches in the latter side edges thereof within which said bars are slidable, said block engaging said first stop shoulder and having a hole therethrough through which said rod extends and in which it is slidable, a fourth element slidable on said second element and interposed between said third element and the second stop shoulder on the first element and engageable with said latter stop shoulder, a second stop shoulder on said second element on the side of the third element remote from the other arm, facing the latter arm and engageable with said third element, and a compression spring surrounding said second element and bearing at one end against said third element and bearing at its other end against said fourth element, said spring normally urging said fourth element against said second stop shoulder on the first element and urging the third element against said second stop shoulder on the second element, said first stop shoulder on said second element being engageable with said fourth element when compressional forces are applied to the link assembly by said attaching means to compress said spring against said third element, said second stop shoulder on the second element being*

*engageable with said third element to compress said spring against said fourth element when tensional forces are applied to the link assembly by said attaching means.*

References Cited

The following references, cited by the Examiner, are of record in the patented file of this patent or the original patent.

UNITED STATES PATENTS

| | | |
|---|---|---|
| 1,137,145 | 4/1915 | Krarup. |
| 1,460,771 | 7/1923 | Stoner. |
| 1,621,011 | 3/1927 | Harvey et al. |
| 1,705,728 | 3/1929 | Harvey. |
| 1,717,219 | 6/1929 | Jones. |
| 1,757,164 | 5/1930 | Blake et al. |
| 1,837,192 | 12/1931 | Barrows et al. |
| 2,360,740 | 10/1944 | Sturdy. |
| 2,372,214 | 3/1945 | Loepsinger. |
| 2,526,373 | 10/1950 | LeClair. |
| 2,695,809 | 11/1954 | Hooker. |

FOREIGN PATENTS

| | | |
|---|---|---|
| 412,838 | 7/1910 | France. |

ARTHUR L. LA POINT, *Primary Examiner.*

EUGENE G. BOTZ, *Examiner.*

S. KRAWCZEWICZ, *Assistant Examiner.*